(12) United States Patent
Janik

(10) Patent No.: US 6,881,334 B2
(45) Date of Patent: Apr. 19, 2005

(54) ECCENTRIC INTERFERENCE RETENTION SYSTEM FOR A FILTER CARTRIDGE

(75) Inventor: Leon P. Janik, Suffield, CT (US)

(73) Assignee: Stanadyne Corporation, Windsor, CT (US)

( * ) Notice: Subject to any disclaimer, the term of this patent is extended or adjusted under 35 U.S.C. 154(b) by 153 days.

(21) Appl. No.: 10/285,208

(22) Filed: Oct. 31, 2002

(65) Prior Publication Data
US 2004/0084362 A1 May 6, 2004

(51) Int. Cl.⁷ ............................................. B01D 27/08
(52) U.S. Cl. ......................... 210/232; 210/249; 210/443
(58) Field of Search .................................. 210/438, 440, 210/443, 444, 232, 249

(56) References Cited

U.S. PATENT DOCUMENTS

| | | | |
|---|---|---|---|
| 3,319,791 A | | 5/1967 | Horne .......................... 210/234 |
| 3,513,979 A | * | 5/1970 | Miller et al. ................. 210/232 |
| 5,017,285 A | | 5/1991 | Janik et al. .................. 210/232 |
| 5,203,994 A | | 4/1993 | Janik .......................... 210/232 |
| 5,302,284 A | | 4/1994 | Zeiner et al. ................ 210/232 |
| 5,744,030 A | | 4/1998 | Reid et al. ................... 210/235 |
| 6,187,188 B1 | | 2/2001 | Janik et al. .................. 210/232 |
| 2004/0084360 A1 | * | 5/2004 | Janik .......................... 210/222 |
| 2004/0084361 A1 | * | 5/2004 | Janik et al. .................. 210/232 |
| 2004/0084363 A1 | * | 5/2004 | Janik .......................... 210/443 |

FOREIGN PATENT DOCUMENTS

| | | | | |
|---|---|---|---|---|
| EP | 0318079 A1 | * | 5/1989 | ........... B01D/27/08 |
| EP | 0 826 407 B1 | | 3/2001 | |
| EP | 1 125 621 A2 | | 8/2001 | |

OTHER PUBLICATIONS

International Search Report for International Application No. PCT/US03/33345, filed Oct. 21, 2003.

* cited by examiner

Primary Examiner—Matthew O. Savage
(74) Attorney, Agent, or Firm—Alix, Yale & Ristas, LLP

(57) ABSTRACT

A filter assembly employs radial interference between the received portion of a filter cartridge housing and the receptacle of a base. Radial interference occurs between a tapered end cap of the filter cartridge and a substantially cylindrical inside surface of the base receptacle. The filter cartridge end cap is tapered such that the interference increases as the cartridge is urged into the receptacle by a retaining collar. The tight fit improves resistance to vibration and shock applied to the filter assembly. Metal to metal contact at the interference points also provides a reliable electrical contact between the base and the cartridge to prevent accumulation static charges in the cartridge.

9 Claims, 6 Drawing Sheets

ECCENTRIC INTERFERENCE RETENTION SYSTEM FOR A FILTER CARTRIDGE

BACKGROUND OF THE INVENTION

1. Field of the Invention

This invention relates generally to fuel filters employed in connection with internal combustion engines. More particularly, the present invention relates to a base receptacle which receives a replaceable fuel filter cartridge to form a filter assembly for removing foreign particles and/or separating water from the fuel supply system of an internal combustion engine.

2. Description of the Related Art

Fuel filter systems to which the invention relates commonly employ a disposable filter cartridge that is replaced at pre-established intervals of filter usage. The replaceable cartridge is conventionally secured to a base that defines inlet and outlet connections between the cartridge and the fuel supply system. Numerous retention systems have been employed for securing the filter cartridge to the base and allowing removal of the cartridge for replacement purposes.

Filter assemblies to which the present invention relates are typically mounted to motor vehicles such as automobiles, trucks, farm equipment, industrial equipment and construction equipment such as bulldozers. Operation of these types of equipment frequently exposes the filter assembly to extreme vibration and shock. To be commercially viable, a filter system must reliably maintain a sealed relationship between the disposable filter cartridge and the base. Filter cartridge replacement should be simple and preferably accomplished without tools.

The disposable filter cartridge is conventionally secured to the filter assembly base by a retaining or locking mechanism, which is releasable to allow for the removal of the cartridge for replacement purposes. There are numerous conventional fuel filter cartridge base retention systems. In U.S. Pat. No. 5,017,285, which is assigned to the assignee of the present invention, one disclosed inverted fuel filter assembly employs a base that mounts to the vehicle and a disposable filter cartridge that is suspended directly below the base. The cartridge is retained to the base by a threaded collar. The collar includes a shoulder that retentively engages against a roll seam structure at the periphery of the cartridge housing. The collar threads to the base. The cartridge is replaced by loosening the threaded collar and dismounting the filter cartridge. While this type of retainer device performs in an acceptable manner, the threaded collar can introduce uneven loading between different fuel filter assemblies as well as within a given fuel filter depending upon the degree of tightening or torque applied to the retainer collar. In addition, the threads are subject to exposure to various fluids and particulate matter, which may seriously jeopardize the integrity and efficiency of the threaded engagement. In the field, it is often problematical to ascertain the proper torque or tightening technique that should be applied to properly secure the cartridge to the base.

U.S. Pat. Nos. 5,203,994 and 5,302,284, both assigned to the assignee of the present invention (hereinafter the '994 and '284 patents, respectively) exemplify improvements to the basic filter system disclosed in the '285 patent discussed above. The '994 and '284 patents describe a filter system in which the threaded attachment is replaced by a spiral ramp structure on the base and a complementary follower structure in the retainer collar. The base includes a stop angularly spaced from an upper end of the spiral ramp structure of the base. The follower structure includes a catch configured to seat between the upper end of the base spiral ramp and the angularly spaced stop. The '994 patent discloses a spring disposed between the received end of the cartridge and the base to releasably maintain the locked position of the collar follower over the upper end of the base spiral ramp by biasing the cartridge and collar away from the base. The '284 patent discloses a collar that carries a wave spring to bias the collar away from the base and maintain the locked position of the collar follower over the upper end of the base spiral ramp. Each of the spring members is configured to evenly distribute the load between the base and the cartridge.

An alternative filter cartridge mounting system is disclosed in U.S. Pat. No. 6,187,188, also assigned to the assignee of the present invention. The roll seam at the junction of the cartridge housing sections is radially outwardly displaced to form a plurality of retention tabs. The base includes a fixed retaining structure comprising a retaining lip defining a plurality of axial slots in communication with retaining channel portions above the retaining lip. An upper surface of the retaining lip defines a ramp leading to a seat axially below the top of the ramp. The filter cartridge is retained to the base by axially aligning the tabs with the slots and upwardly displacing the cartridge into the receptacle of the base. The cartridge is then rotated so that the tabs ride up the ramps and into the seats. A resilient radial extension of the central sealing grommet provides a biasing force between the received end of the filter cartridge and the base. This biasing force maintains the tabs in their seats and resists unintentional reverse rotation of the cartridge relative to the base.

While the above-discussed filter cartridge retention systems perform in an acceptable manner and have proven commercially successful, further enhancements in the security of cartridge retention that do not complicate filter assembly construction or cartridge replacement may be possible.

SUMMARY OF THE INVENTION

Briefly stated, the invention relates to a filter assembly that includes a replaceable filter cartridge with a convoluted peripheral roll seam connecting a cartridge housing end cap to a housing second section. The convoluted roll seam provides a peripheral compatibility matrix associated with the cartridge. In one embodiment of the filter cartridge, the roll seam includes portions or segments that are outwardly and inwardly displaced relative to the remainder of the generally circular roll seam. Outward deformation of the roll seam distorts what would ordinarily be a cylindrical wall of the end cap. The end cap distortion is greatest axially adjacent the roll seam and angularly at the center of each outwardly displaced portion of the roll seam. The resulting end cap configuration tapers outwardly at each outwardly displaced portion as the side wall of the end cap progresses away from the end of the cartridge toward the roll seam.

The complex shape of the end cap side wall influences the design of the base receptacle that receives the end cap. The cartridge end cap would unacceptably bind or jam in a receptacle having a diameter configured for reception of an undistorted (cylindrical) end cap. One embodiment of a base receptacle includes tapered portions of the inside surface of the receptacle to accommodate the distortions of the side wall. Alternatively, the base incorporates a cylindrical receptacle having a diameter selected to produce an interference fit between the distorted end cap side wall and receptacle wall. A collar having a follower engages ramp structures on the outside surface of the receptacle wall to retain the cartridge to the base.

The resulting retention of the cartridge to the base is enhanced by friction between the distorted end cap side wall and the receptacle. The tight relationship between the cartridge and the base helps the filter assembly resist vibratory stresses applied to the cartridge/base interface during use. Further, the interference fit provides a reliable electrical contact between a metal base and the typically sheet metal end cap of the filter cartridge. Reliable electrical contact between a filter cartridge and a base is desirable in applications where the accumulation of static charge is to be avoided.

A retaining collar passes over the larger diameter end of the filter cartridge housing to engage the roll seam of the filter cartridge. In one embodiment of a filter assembly, inwardly projecting followers on the collar mate with outwardly projecting spiral ramp structures on the outside surface of the base receptacle wall. When installed, the retaining collar provides a removable connection between the roll seam of the cartridge and the base.

An object of the present invention is to provide a new and improved retention system for releasably retaining a disposable filter cartridge to the base of a filter system.

Another object of the invention is to provide a new and improved retention system for retaining a disposable filter cartridge to a filter system base in a mounting configuration of high sealing integrity, and which is highly resistant to vibratory stresses. Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

Figure 1:
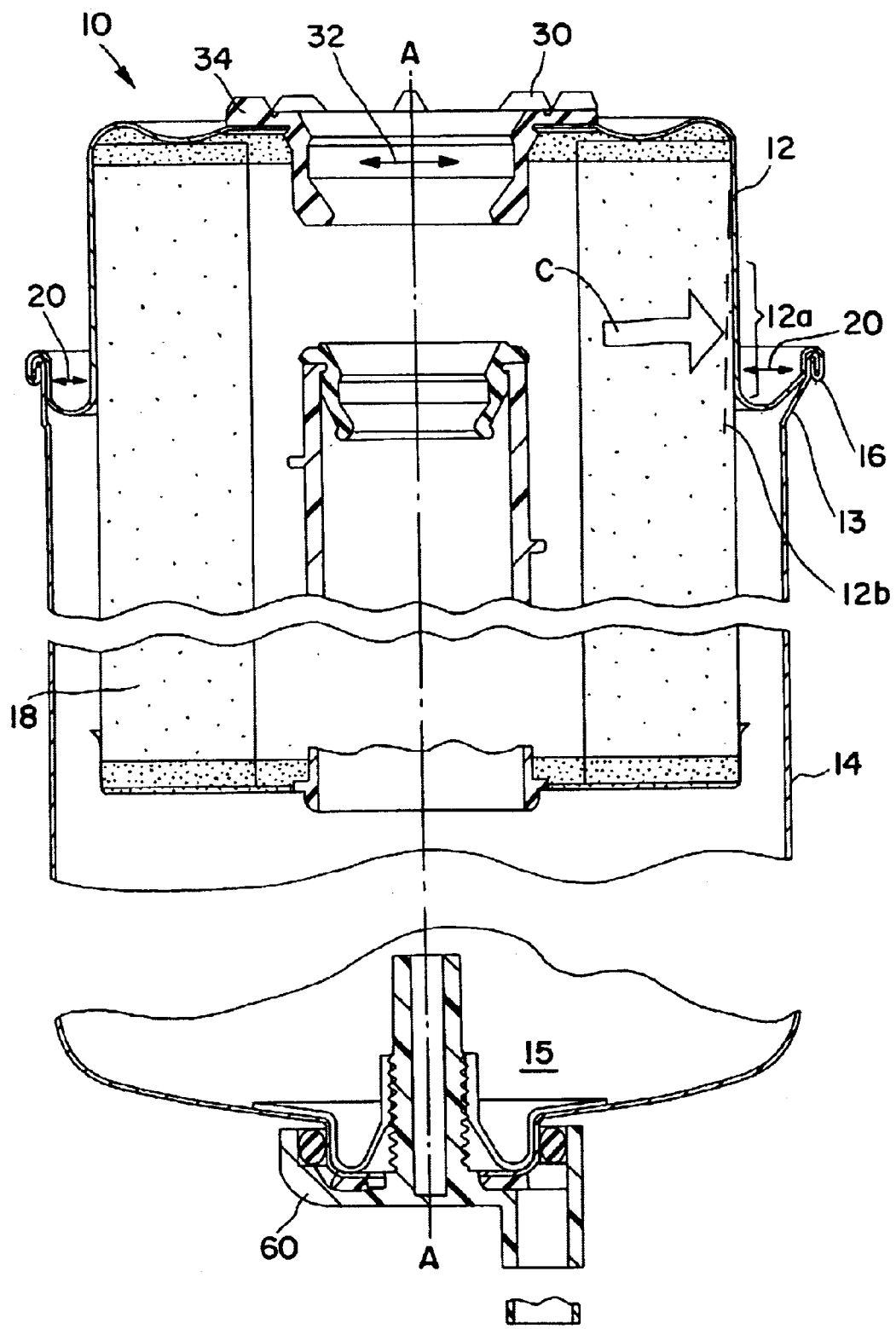
FIG. 1 is a vertical sectional view, partly broken away, of a filter cartridge exemplary of several aspects of the present invention.
Figure 2:
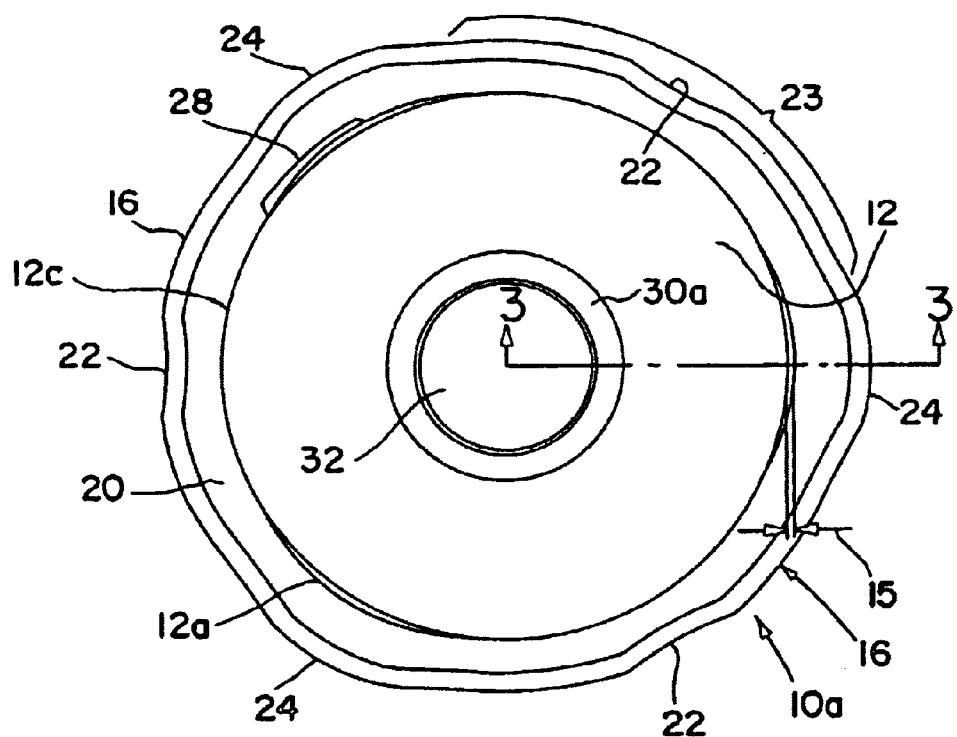
FIG. 2 is a top plan view of an alternative embodiment of a filter cartridge exemplary of several aspects of the present invention.
Figure 3:
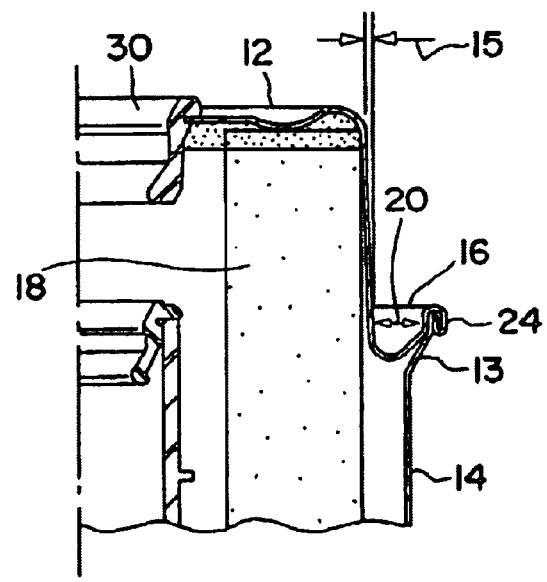
FIG. 3 is a partial vertical sectional view of the filter cartridge of FIG. 2, taken along line 3—3 thereof.
Figure 8:
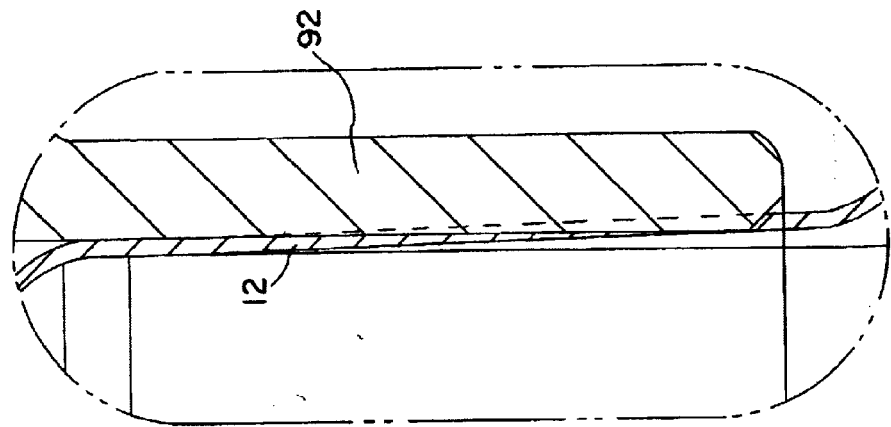
FIG. 8 is an enlarged portion of FIG. 7.
Figure 9:
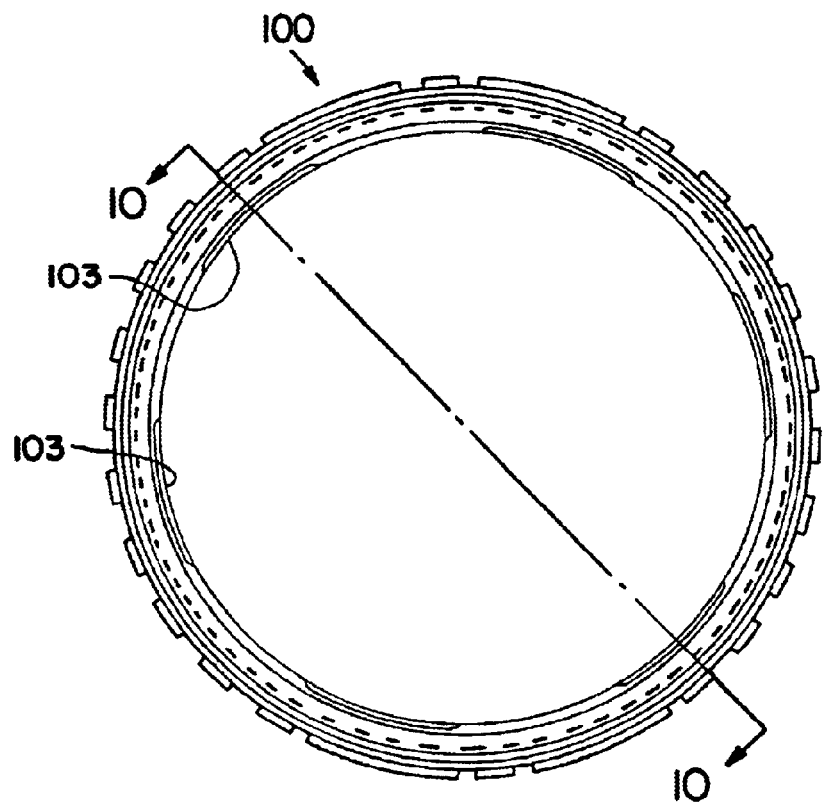
FIG. 9 is a bottom view, partly in phantom, of a retaining collar for retaining the filter cartridges of FIG. 1–3 to the base component of FIG. 4.
Figure 10:
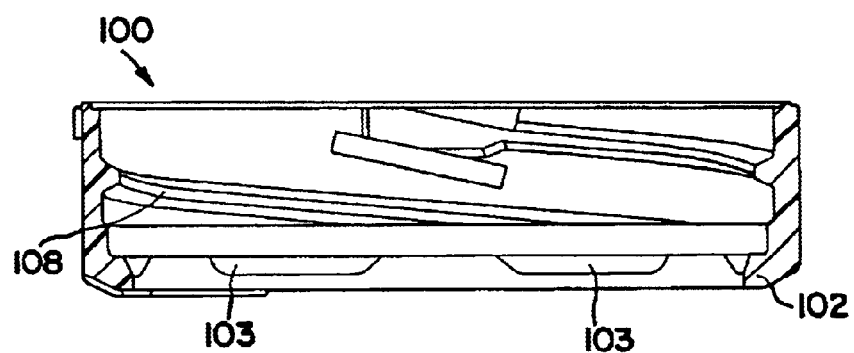
FIG. 10 is a sectional view of the collar of FIG. 9, taken along line 10—10 thereof.

Filter cartridges exemplary of aspects of the present invention will be described with reference to FIGS. 1–3 and are generally designated by the numeral 10. Embodiments of a filter base component compatible with the cartridges of FIGS. 1–3 are shown in FIGS. 4–8 and are generally designated by the numeral 80. An embodiment of a retaining collar appropriate for securing a filter cartridge 10 to a base component 80 is shown in FIGS. 9 and 10 and is generally designated by the numeral 100.

FIG. 1 is a sectional view through a filter cartridge 10 comprising a first housing section 12 joined to a second housing section 14 along a peripheral roll seam 16. The first housing section, or end cap 12 has a smaller diameter than the second housing section 14. The sheet metal of the respective housing sections which forms the roll seam is illustrated in the form of dotted lines to the left and right of the filter cartridge 10 adjacent the roll seam in FIG. 1. The sheet metal extending from the housing first section 12 extends radially beyond the sheet metal of extending from the housing second section 14. When rolled together to form the roll seam, the extended radial length of the sheet metal of the housing first section 12 is rolled under and overlaps the sheet metal of the housing second section 14. The rolled, overlapping sheet metal is then crimped to form the roll seam in a manner known in the art. A U-shaped bend in the housing first section 12 inwardly of the roll seam 16 defines a space 20 between the roll seam and the housing first section 12. This space 20 allows access to the interior of the roll seam 16 during seam formation and for the purposes of deformation as will be discussed below.

The filter cartridge 10, except for certain features described herein, has an overall general configuration and functionality that is well understood by those of skill in the art. A filter element 18 is supported within the filter cartridge 10. A grommet 30 surrounds an axial opening 32 in the housing first section 12 that receives coaxial conduits (not shown) for delivery of unfiltered fluid and retrieval of filtered fluid from the filter cartridge 10. The housing second section 14 may be provided with a drain cock 60 for removal of water that may accumulate in a sump 15 defined by the lower portion of the housing second section 14. None of the interior structures are specifically part of the invention. The interior structure of the cartridge may, for example, be similar in form and function to that described in U.S. Pat. Nos. 5,302,284, 5,614,091, and 5,766,463.

FIGS. 2 and 3 are top plan and partial sectional views, respectively, of an alternative filter cartridge 10a similar to the cartridge 10 of FIG. 1. Alternative filter cartridge 10a carries an alternative grommet 30a without a radially extending resilient portion 34. In all other respects, the filter cartridges 10, 10a are substantially identical and the description of cartridge 10a is equally applicable to cartridge 10. The roll seam 16 circumscribes the filter cartridge 10a radially separated from the housing first section 12 to define an annular space 20. The roll seam 16 includes three portions that are radially outwardly displaced relative to the central axis A of the cartridge to form retention tabs 24. The retention tabs 24 are illustrated as being equiangularly arranged on the circumference of the roll seam and of equal angular extent and radial displacement. Three roll seam portions 23 extend between the retention tabs 24. In the illustrated embodiment, each of these portions 23 of the roll seam include a radially inwardly displaced segment 22. The inwardly displaced segments 22 provide an additional variable for use in conjunction with a cartridge compatibility matrix. The inwardly displaced segments 22 of the roll seam 16 on the exemplary filter cartridge 10a are diametrically opposed to each retention tab 24.

The inward and outward displacement of the roll seam relative to its generally circular shape result in a peripheral shoulder with a serpentine configuration. This complex shape is advantageously located at the radial outer periphery of the filter cartridge. A compatibility matrix including a serpentine, or convoluted outer periphery of the filter cartridge presents unique opportunities for blocking reception of cartridges omitting portions of the compatibility matrix. Further, inward and outward displacement of the roll seam 16 relative to the central axis A of the cartridge defines an annular space 20 having a variable radial dimension when measured perpendicular to the cartridge axis A, as best seen in FIG. 2. The shape of the annular space 20 may be used as part of a cartridge compatibility matrix when the cartridge 10 is axially received by a base component 80, 80a shown in FIGS. 4–8 and retained thereto by the collar 100 shown in FIGS. 9 and 10. In accordance with a further aspect of the present invention, the outer profile of the roll seam 16 may used as a constituent of a cartridge compatibility matrix in other base embodiments where the roll seam is axially received by a fixed retaining structure.

It should be noted that inward and outward displacement of the roll seam may alter the configuration of the filter cartridge end cap 12 and second section 14. As best seen in the right-hand portion of FIG. 1, the housing second section 14 is displaced outwardly at 13 adjacent the outwardly displaced portion 24 of the roll seam 16. Further, outward displacement of the roll seam 16 causes a portion tapered 12a of the generally cylindrical wall of the end cap 12 to be displaced outwardly as indicated by arrow C relative to a line 12b parallel to central axis A. As seen in FIG. 2, the end cap 12 includes non-tapered portions 12c that are angularly located between tapered portions 12a. The outward deformation of the end cap 12 increases as the cylindrical wall axially progresses toward the housing second section 14 (see FIG. 1). This outward deformation of the end cap 12 is greatest at the center of the outwardly displaced portions 24 of the roll seam 16. As a result, the wall of the end cap 12 is eccentrically deformed to a non-cylindrical configuration in which the wall tapers gradually outwardly at locations centered on each outwardly displaced portion 24 of the roll seam 16. There are three such outward deformations 12a in the illustrated embodiment 10 as best seen in FIG. 2. The outward deformations 12a reach a maximum radial dimension 15 of approximately 0.035".

FIGS. 4–8 illustrate two representative embodiments of a base component 80, 80a configured to receive the cartridges 10, 10a illustrated in FIGS. 1–3. The filter base comprises a cast or molded component 80, 80a with a generally cylindrical receptacle wall 92 defining a receptacle 87 into which the first section or end cap 12 of the cartridge housing is axially receivable. The cartridge 10, 10a is retained to the base by a collar 100 (illustrated in FIGS. 9 and 10).

Figure 4:
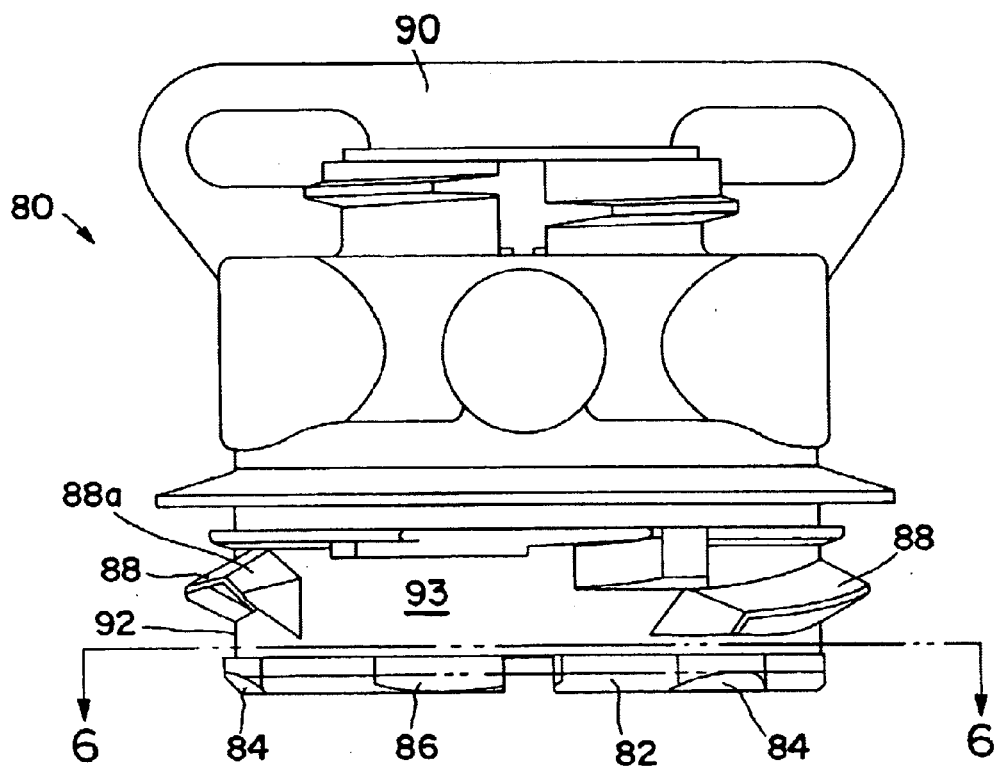
FIG. 4 is a front exterior view of a filter assembly base component configured to receive the filter cartridges illustrated in FIGS. 1–3.
Figure 5:
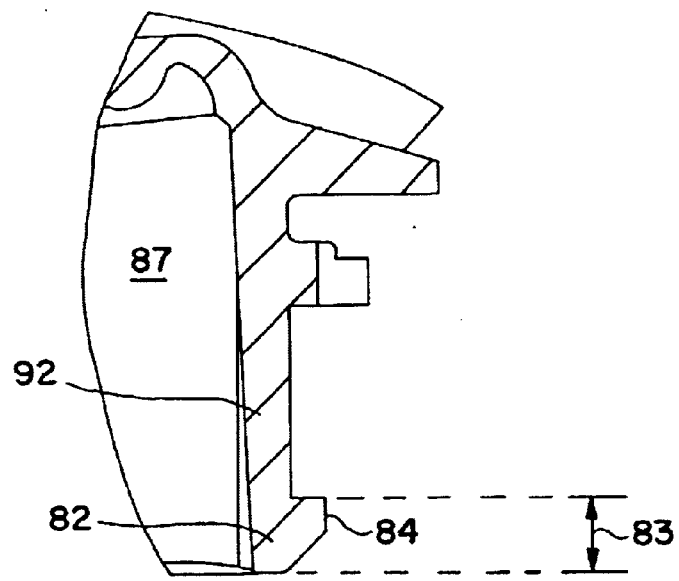
FIG. 5 is a partial sectional view of the filter assembly base component of FIG. 4, taken along line 5—5 of FIG. 6.
Figure 6:
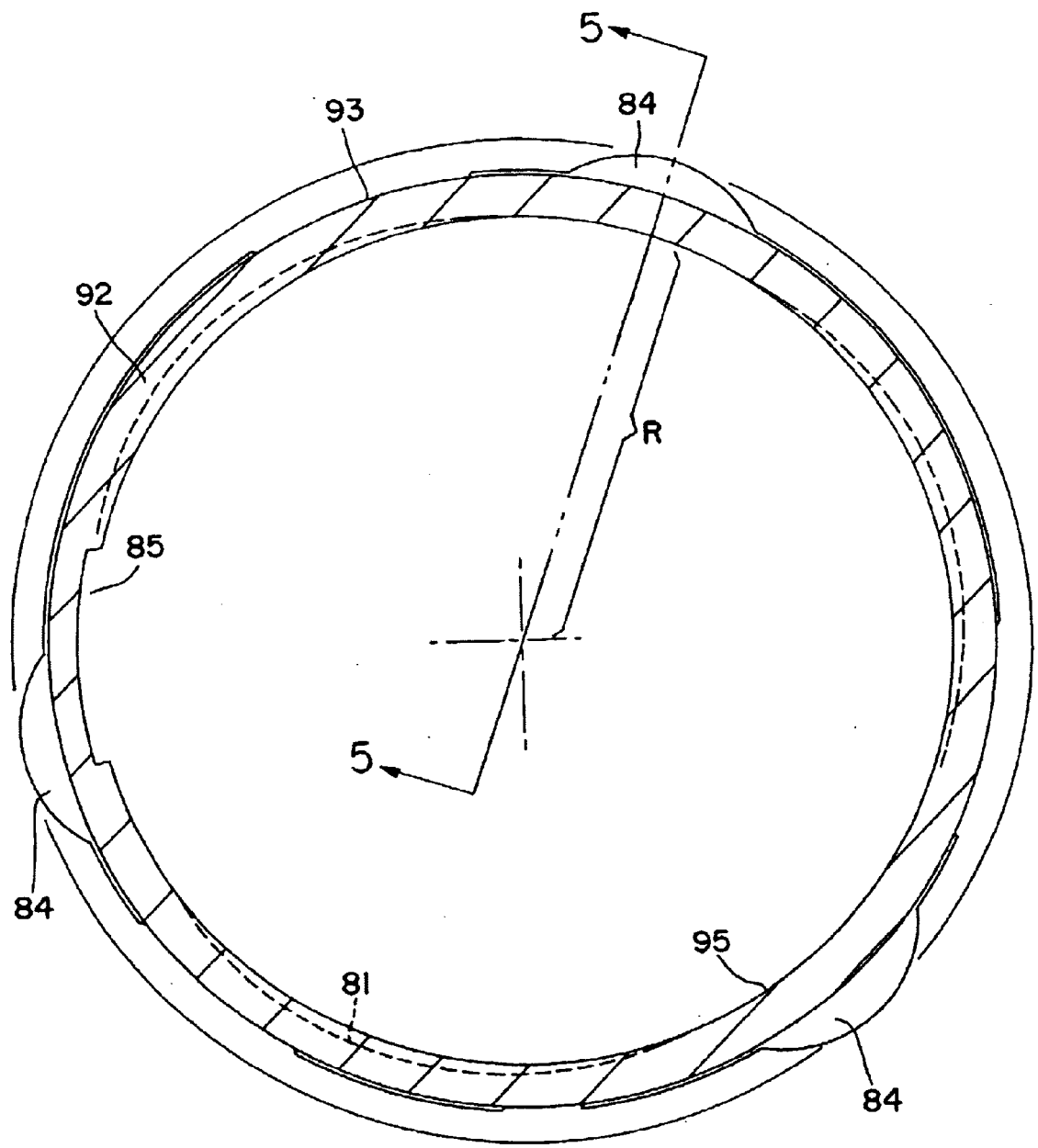
FIG. 6 is a sectional view, partly in diagrammatic form, of the filter base component of FIG. 4, taken along line 6—6 thereof.
Figure 7:
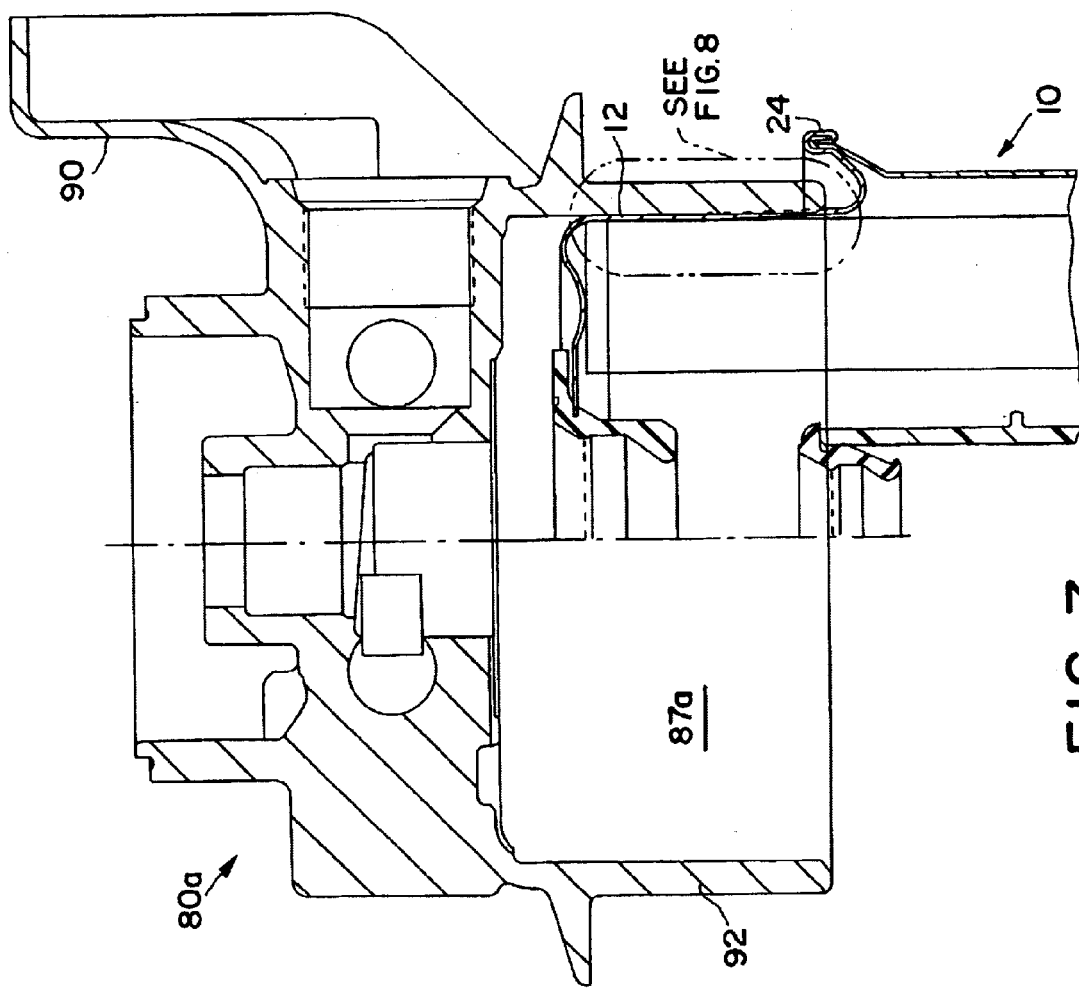
FIG. 7 is a sectional view of an alternative base component in functional conjunction with a partial vertical sectional view of the filter cartridge of FIGS. 2 and 3.

With particular reference to FIGS. 4–6, the receptacle wall 92 of base component 80 axially terminates in a lip 82. The lip 82 is provided with a sectional configuration (best seen in FIG. 6) complementary to the radial dimensions of the annular space 20 defined between the end cap 12 of the cartridge housing and the roll seam 16. Radial outward projections 84 of the lip 82 correspond to the location and general configuration of the radially outward displaced portions 24 of the roll seam 16. The base component 80 may be cast with locations 86 where the lip 82 is thinned or notched to accommodate inwardly displaced segments 22 of the roll seam 16. Alternatively, lip material may be removed after production of the base component 80, such as by machining the lip 82 at locations 86. In illustrated base component 80, the lip 82 with its cartridge compatibility elements 84, 86 occupies an axial end portion 83 of the receptacle wall 92 as best seen in FIGS. 6–8. This axial end portion 83 has an axial length of approximately 0.2" in the illustrated embodiment.

An outside surface 93 of the receptacle wall 92 may include a pair of integral outwardly projecting diametrically opposed ramps 88 that ascend spiral-like around the base component 80. The upper ends 88a of the ramps 88 are beveled. The inside surface 95 of the receptacle wall 93 may be noncircular as best illustrated in FIGS. 5 and 6. Relative to a circle 81, the inside surface 95 of the receptacle wall 93 is noncircular, reaching a maximum radial dimension R centered on the outward projections 84 of the lip 82. This noncircular configuration of the inside surface 95 of the receptacle wall 93 may be provided to accommodate the noncircular shape of the end cap 12 of the filter cartridge housing discussed above.

With reference to FIG. 5, it will be noted that the noncircular formation of the inside surface 95 of the receptacle wall 93 tapers from a maximum adjacent the lip 82 to a minimum as the receptacle wall 92 progresses toward the header of the base component 80. This tapered and noncircular configuration corresponds to the tapered and noncircular configuration of the housing end cap 12 as discussed above. The combination of a shaped (non-cylindrical) inside surface 95 and coded lip 82 exterior profile including radial projections 84 and locations 86 of removed material provide a complex sectional shape to the lip 82 of the receptacle wall 92. This complex sectional shape reflects the complex radial dimensions of the space 20 defined between the convoluted roll seam 16 and the cartridge housing end cap 12. Axial tracks 85 on the inside surface 95 of the receptacle wall add additional elements to the cartridge compatibility matrix defined by the coded lip 82 of the receptacle wall 92. Those of skill in the art will observe that it is possible to rotate the pattern of axial tracks 85 on the inside surface 95 of the receptacle wall 92 relative to the configuration of the lip 82. Further, the configuration of outward projections 84 and thinned locations 86 may be varied to provide alternative cartridge compatibility matrices defined by the coded lip 82. In combination, the configuration of the coded lip 82 and inside surface 95 of the receptacle wall 92 may be varied and shifted relative to each other to provide a unique cartridge compatibility matrix for any given filter assembly including a base and cartridge. Each cartridge compatibility matrix comprises elements that block incompatible cartridges lacking complementary structures from reception and mating with the base.

With reference to FIGS. 7 and 8, the noncircular configuration of the housing end cap 12 may alternatively be received in a cylindrical receptacle. The receptacle diameter may be selected to be greater than the smallest diameter of the end cap but smaller than the diameter of the distorted portions 12a of the end cap 12. The base component of FIGS. 7 and 8 omits many structural details of the base of FIGS. 4–6 for clarity, but should be understood to function in a substantially identical fashion with respect to the reception and mounting of filter cartridges 10, 10a. The diameter of the cylindrical receptacle 87a is selected to provide radial interference or frictional engagement between the end cap 12 of the filter cartridge and the inside surface of the receptacle wall. In other words, the diameter of the cylindrical receptacle 87a is slightly larger than would be required to accommodate the end cap of a filter cartridge without the outwardly deformed portions 12a of the end cap side wall, but not quite large enough to accommodate the deformed end cap 12 without interference.

With reference to FIGS. 9 and 10, the collar 100 includes a pair of diametrically opposed spiral followers 108 that integrally extend inwardly from the collar 100. The followers 108 are dimensioned and positioned for engagement with the ramps 88 on the base component 80. The followers 108 slidably engage and ascend the ramps 88 upon alignment and angular rotation of the collar 10 relative to the base component 80 and received cartridge 10. An inwardly projecting annular shoulder 102 of the collar 100 bears against the radially projecting roll seam 16 of the cartridge 10 to releasably lock the cartridge 10 to the base component 80.

A spring or other biasing element (not shown) in the base receptacle 87 biases the cartridge 10 and collar 100 away from the base component 80 to maintain the collar followers 108 in a locked position over the beveled end 88a of the ramps 88. The shoulder 102 of the collar 100 includes a plurality of locations 103 where the lip and adjacent structure is recessed or lip material is removed to accommodate the outward deflection 13 of the housing second section 14 adjacent each outward deformation of the roll seam 16. In the illustrated embodiment, the collar is provided with six locations 103 where lip material is removed. The six locations 103 correspond to the two possible engaged positions of the collar 100 relative to the base component 80 and the received filter cartridge 10. The cartridge is biased toward the collar 100 such that outward deflections 13 of the housing second section fit into three of the six locations 103. The collar is thus releasably engaged with both the base component and the filter cartridge, further enhancing the security of the collar 100 in its locked position by resisting unintentional reverse rotation of the collar 100 relative to the received cartridge 10.

Axial insertion of the tapered end cap 12 into a cylindrical receptacle 87a results in radial interference in multiple locations around the circumference of the receptacle/end cap interface. In the illustrated embodiment, the areas of radial interference are advantageously equiangularly distributed around the circumference of the receptacle/end cap interface. Rotation of the collar 100 relative to the base 80a and received cartridge 10 will advance the end cap 12 of the cartridge 10 into the receptacle 87a. The radial interference between the end cap 12 and the cylindrical receptacle 87a will increase as the collar followers 108 ride up the spiral ramps 88, advantageously reaching a maximum when the collar followers are in their locked position over the beveled end 88a of the ramps 88.

Radial interference between the cartridge end cap 12 and the base receptacle 87a complements the axial retention provided by the collar 100 and biasing member. The result is a filter assembly having improved resistance to vibratory and shock stresses applied to the mounting interface. The tight fit also provides a reliable electrical contact between the cartridge and the base. Static charges that may have accumulated in an electrically isolated sheet metal cartridge are effectively eliminated.

While preferred embodiments of the present invention have been set forth for the purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:

1. A filter assembly comprising:
   a filter cartridge comprising:
      a filter element extending between axially separated first and second ends;
      a housing end cap surrounding the first end of the fitter element, said housing end cap having a first end defining an axial opening, a side wall extending from the first end to a second end including a U-shaped bend; and
      a housing second section defining a portion of the cylindrical space, said housing second section having a first end joined to the housing end cap second end by a roll seam, the second end of the housing second section surrounding the second end of the filter element,
      wherein the side wall of said end cap tapers radially outwardly from a first diameter at the first end to a larger second diameter at the second end in at least one location; and
   a base for mounting said filter cartridge to filter a flow of fluid delivered to and retrieved from said filter cartridge through said base, said base comprising:
      a receptacle wall having an inside surface defining a generally cylindrical receptacle with a third diameter and an outside surface including outwardly projecting first engagement structures, said third diameter being larger than said first diameter but smaller than said second diameter; and
      a hoop-shaped collar having a first end configured to pass over said cartridge second section, an interior surface including inwardly projecting second engagement structures complementary to said first engagement structures, and
   a second end including an inwardly projecting annular shoulder engagable
   against the radially projecting roll seam of the filter cartridge,
   wherein said cartridge housing end cap is axially received in said receptacle with radial interference between the inside surface of the receptacle wall and the side wall of the end cap, and said collar is axially installed over said cartridge second section bringing said shoulder to bear axially against said roll seam and said collar is rotated relative to said base and cartridge whereby said second engagement structures mate with said first engagement structures to releasably axially retain the cartridge to the base in a substantially fixed axial and rotational relationship.

2. The filter assembly of claim 1, wherein said at least one location comprises a plurality of equiangularly distributed locations and said radial interference between the inside surface of the receptacle wall occurs at the interface of said plurality of equiangularly distributed locations with the inside surface of the receptacle wall.

3. The filter assembly of claim 2, wherein said plurality of equiangularly distributed locations comprises three equiangularly distributed locations.

4. A filter assembly comprising:
   base means defining a receptacle having an inside surface; and
   filter cartridge means mountable to said base means, an end portion of said
   cartridge means being receivable in said receptacle, said end portion having an outside surface including a plurality of tapered portions which taper radially outwardly from a first diameter to a larger second diameter at a plurality of angularly spaced locations, and a plurality of non-tapered portions angularly located between said tapered portions,
   wherein said end portion of the cartridge produces radial interference between the outside surface of the end/portion and the inside surface of the receptacle upon reception of the end portion into the receptacle.

5. The filter assembly of claim 4, wherein the inside surface of the receptacle is generally cylindrical and has a first diameter and the outside surface of the end portion is distorted from a generally cylindrical configuration at said plurality of angularly spaced locations.

6. A filter assembly comprising:

a filter cartridge comprising:
   a housing end cap having a first end defining an axial opening, a side wall extending from the first end to a second end including a U-shaped bend; and
   a housing second section having a first end joined to the housing end cap second end by a roll seam,
   wherein the side wall of said end cap tapers radially outwardly from a first diameter at the first end to a larger second diameter at the second end; and
a base for mounting said filter cartridge to filter a flow of fluid delivered to and retrieved from said filter cartridge through said base, said base comprising:
   a receptacle wall having an inside surface defining a generally cylindrical receptacle having a third diameter, said third diameter being larger than said first diameter but smaller than said second diameter,
   wherein said cartridge housing end cap is axially received in said receptacle with radial interference between the inside surface of the receptacle wall and the side wall of the end cap.

7. The filter assembly of claim 6, wherein the end cap taper is not evenly distributed around a circumference of the end cap and said second diameter is present in at least one location on said circumference.

8. The filter assembly of claim 7, wherein said at least one location comprises a plurality of equiangularly distributed locations and said radial interference between the inside surface of the receptacle wall occurs at the interface of said plurality of equiangularly distributed locations with the inside surface of the receptacle wall.

9. The filter assembly of claim 8, wherein said plurality of equiangularly distributed locations comprises three equiangularly distributed locations.

\* \* \* \* \*

UNITED STATES PATENT AND TRADEMARK OFFICE
CERTIFICATE OF CORRECTION

PATENT NO. : 6,881,334 B2  Page 1 of 1
APPLICATION NO. : 10/285208
DATED : April 19, 2005
INVENTOR(S) : Janik It is certified that error appears in the above-identified patent and that said Letters Patent is hereby corrected as shown below:

Column 8,
Lines 55-63, delete and substitute with the following:
-- filter cartridge means mountable to said base means, an end portion of said cartridge means being receivable in said receptacle, said end portion having an outside surface including a plurality of tapered portions which taper radiaaly outwardly from a first diameter to a larger second diameter at a pluality of angularly spaced locations, and a plurality of non-tapered portions angularly located between said tapered portions, --.

Signed and Sealed this

Twenty-seventh Day of June, 2006

JON W. DUDAS
*Director of the United States Patent and Trademark Office*